Sept. 16, 1947. W. C. DENISON, JR 2,427,591
HYDRAULIC APPARATUS
Filed Nov. 20, 1942 4 Sheets-Sheet 1

INVENTOR
William C. Denison Jr.
BY
Warren K. F. Schmeiding
ATTORNEY

Sept. 16, 1947.  W. C. DENISON, JR  2,427,591
HYDRAULIC APPARATUS
Filed Nov. 20, 1942  4 Sheets-Sheet 2

INVENTOR
William C. Denison Jr.
BY
ATTORNEY

Sept. 16, 1947. W. C. DENISON, JR 2,427,591
HYDRAULIC APPARATUS
Filed Nov. 20, 1942 4 Sheets-Sheet 3

INVENTOR
William C. Denison Jr.
BY
Warren H. F. Schmieding
ATTORNEY

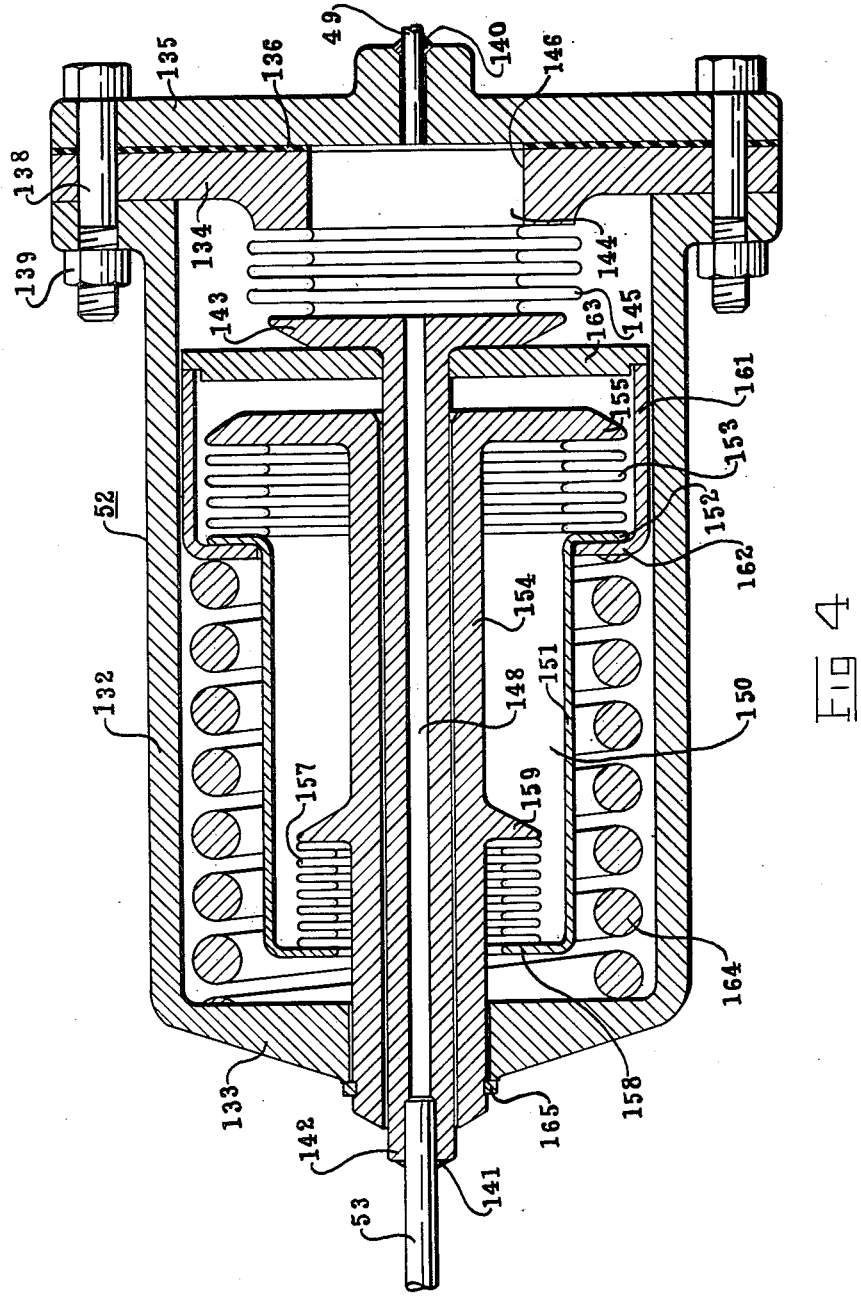

Patented Sept. 16, 1947

2,427,591

UNITED STATES PATENT OFFICE 2,427,591

HYDRAULIC APPARATUS

William C. Denison, Jr., Delaware, nio

Application November 20, 1942, Serial No. 466,373

14 Claims. (Cl. 60—54.5)

The present invention relates to fluid pressure type controllers and more particularly to controllers employing a liquid as a motive fluid.

Such controllers are often subjected to different environment temperatures and a remote part or parts of the fluid in the controller is often subjected to different temperatures than other parts. One of the objects of the present invention is to provide mechanism which compensates for the expansion and contraction of the fluid caused by increasing and decreasing temperatures of the fluid.

Another object of the present invention is to provide compensating mechanism employing fluid having the characteristics of the motive fluid in the controller, subject the fluid in said mechanism to the same environment as the motive fluid in the controller and utilize the expansion and contraction of the fluid in the mechanism for compensating for expansion and contraction of the fluid in the controller.

Quite often the parts of the controller are subjected to different environment temperatures and it is the object of the present invention to provide a plurality of compensating mechanisms and position these mechanisms so that they are affected by the environment of the remote parts.

A still further object of the prevent invention is to provide a controller employing two fluid motors which are connected with one another by a conduit, said fluid motors each comprising an expansible and contractible cell, and to compensate for temperature variations of the motive fluid in the cells and in the conduit by subjecting the cells and the fluid in the conduit to expansible and contractible mechanisms which are also responsive to the environment of the cells and the conduit.

It is still a further object of the present invention to vary the capacity of the closed system provided by the two cells and the connecting conduits by contracting or expanding one of the cells.

Further objects and advantages will be apparent from the following description, reference being had to the accompanying drawings wherein a preferred form of embodiment of the present invention is clearly shown.

In the drawings:

Fig. 4 is a longitudinal sectional view of a compensating controller for the conduit which interconnects the controllers shown in Figs. 2 and 3;

Fig. 5 is a longitudinal sectional view of part of the manual actuator for the controller shown in Fig. 2; and, Fig. 6 is a view showing part of the actuating mechanism shown in Fig. 2, the view depicting a fragment of a sleeve slit longitudinally and then flattened.

Figure 3:
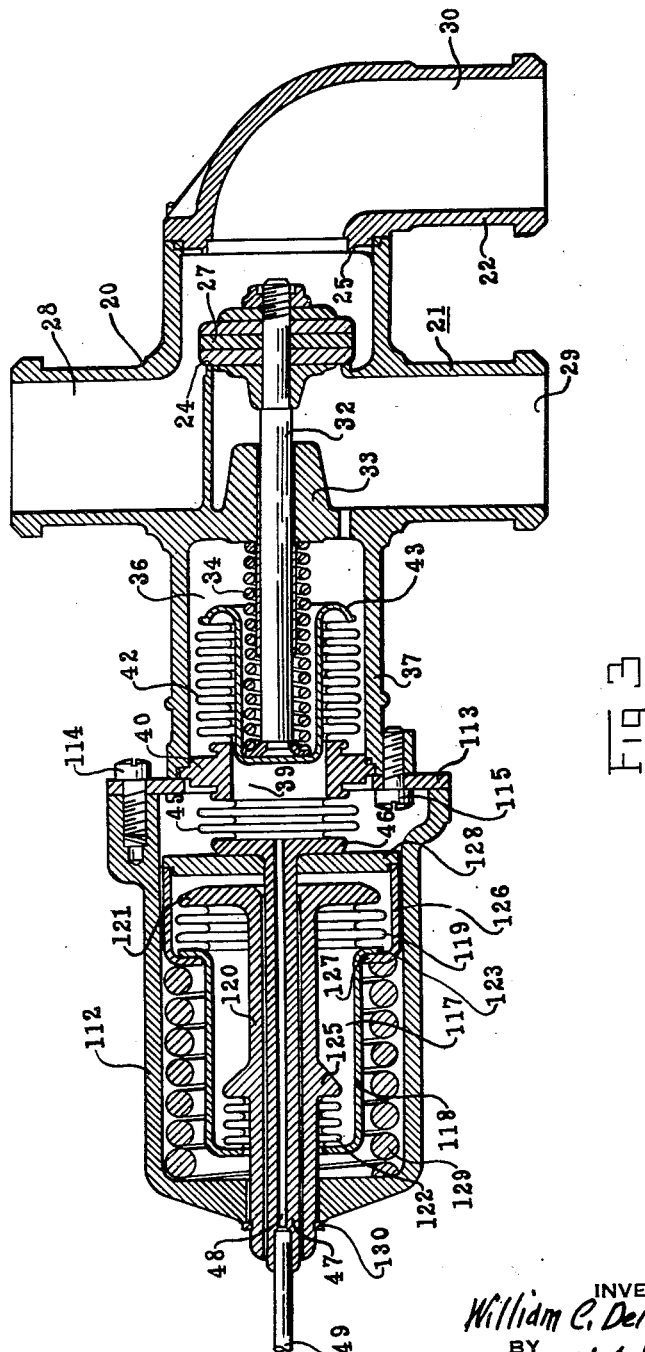
Fig. 3 is a longitudinal sectional view of another of the controllers, the compensating device therefor, and the device to be controlled thereby.

Referring to the drawings, for the purpose of illustrating one use of the invention, the device to be controlled is shown as a valve 20, Fig. 3, including a valve body 21 and a connecting coupling 22. The valve body 21 is provided with a seat 24 and the coupling 22 is provided with a seat 25. A valve 27 is adapted to bear upon the seat 24 to close intercommunication between passages 28 and 29 or, is adapted to bear upon seat 25 to close the passage 30 of coupling 22 or, it may be brought to rest in a position intermediate seats 24 and 25 so that all passages 28, 29 and 30 intercommunicate.

The valve 27 is carried on a stem 32 which passes through a guide 33. A spring 34 surrounds the stem 32 and normally urges the valve 27 against the seat 24. The stem 32 extends into a cavity 36 formed by the hollow extension 37 of the housing 21 which housing also incloses part of a cell 39. The cell 39 includes a supporting ring 40 which is secured to the end of the projection 37. One end of a metallic bellows 42 is hermetically joined with one side of the ring 40 and the other end of the bellows 42 is hermetically joined with a cup 43. The cup 43 extends within the bellows 42 and the interior of the cup houses part of the valve stem 32 and the spring 34 thereof. One end of a bellows 45 is hermetically joined with the opposite side of ring 40 and the other end of bellows 45 is hermetically joined to the flanged end 46 of a sleeve 47. The end 46, bellows 45, ring 40, bellows 42 and cup 43 provide the cell 39. The sleeve 47 forms a passage 48 which is connected with a conduit 49.

Fluid, preferably liquid, is forced through the conduit 49 and passage 48 and into the cell 39 for causing expansion of the bellows 42 which in turn will move the valve away from its seat 24 to a position intermediate seat 24 and seat 25 or against the seat 25, depending upon the quantity of fluid forced into the cell 39. Obviously, when fluid is withdrawn from cell 39 the valve will be moved either to a position intermediate seats 25 and 24 or against seat 24 depending upon the quantity of liquid withdrawn from cell 39. Thus it is apparent, that the cell 39 forms a fluid motor for controlling valve 27.

Figure 1:
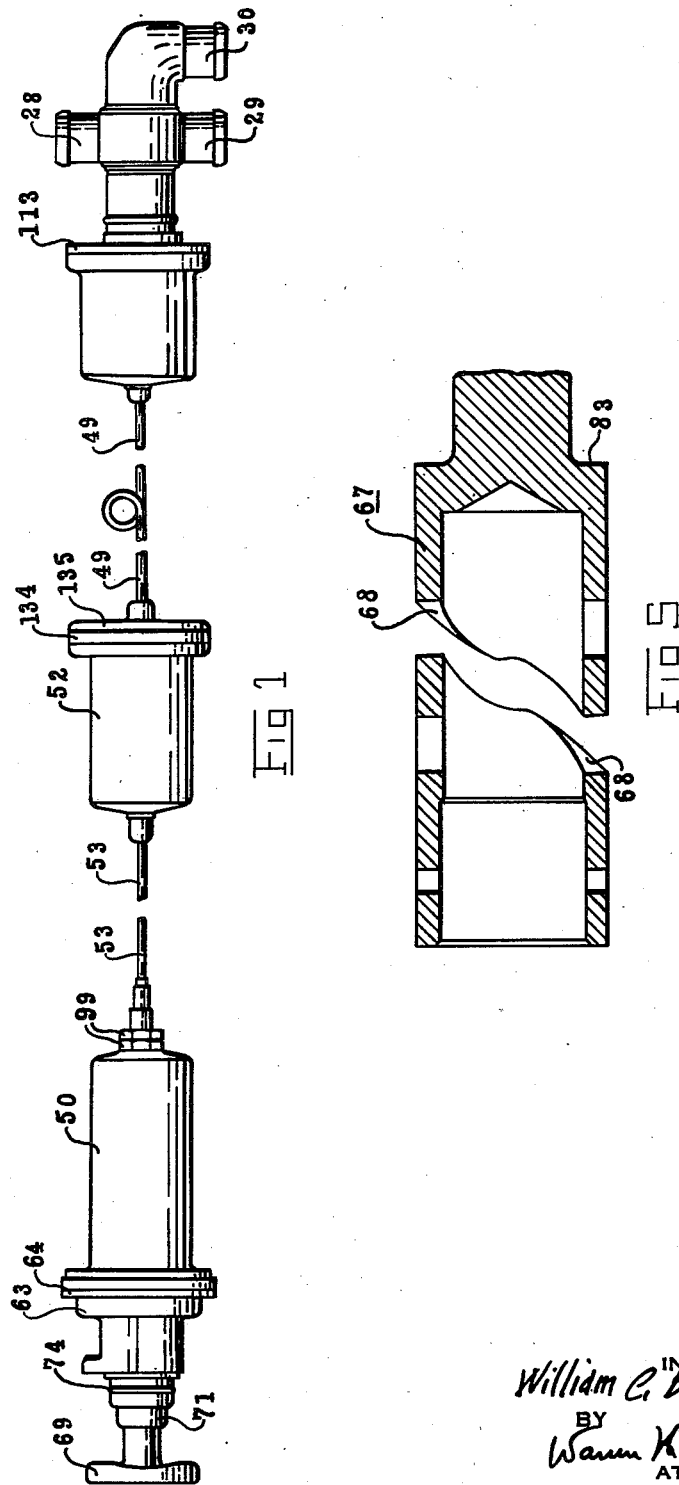
Fig. 1 is a view in elevation of the control apparatus and the device to be controlled.
Figure 2:
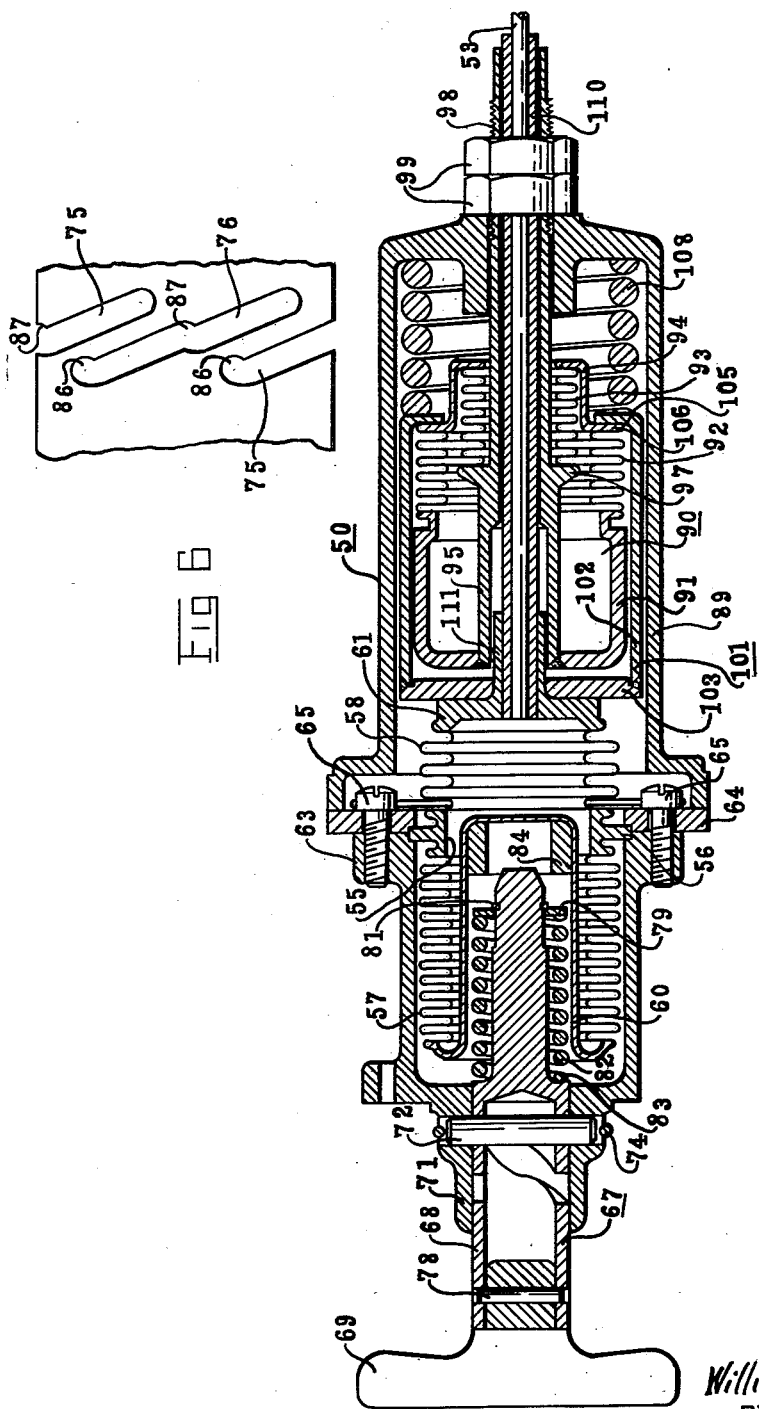
Fig. 2 is a longitudinal sectional view of one of the controllers including the compensating device therefor.

The flow of fluid from and to the motor 39 is controlled by the controller shown in Fig. 2. As will be seen from Fig. 1, the conduit 49 is connected to the controller 50 through a line compensating device 52 and a conduit 53.

A tube 53 is connected with a cell 55 of the controller 50. This cell comprises an intermediate supporting ring 56, two flexible bellows 57 and 58, a cup 60 and an end 61. One end of the bellows 57 is hermetically joined with one side of the ring 56 and the other end is hermetically joined with the flared end of the cup 60. One end of the bellows 58 is hermetically joined with the opposite side of ring 56 and the other end thereof is hermetically joined with the end 61. The intermediate ring 56 is held in place on the end of a casing 63 by a ring 64 and screws 65.

The cell 55, cell 39 and the connecting conduits including the conduits 53, 49 and the intermediate conduit between conduits 53 and 49 are filled with a suitable liquid. The bellows 57 of controller 50 is arranged to be expanded and contracted by applying external pressure on the cell 55. Obviously, when the bellows 57 is compressed, the cell 55 will be decreased in capacity causing the liquid to expand the bellows 42 which in turn will move the valve 27 from its seat 24. When external pressure on the bellows 57 is released, the spring 34 will compress the bellows 42 and cause the liquid to be returned to cell 55.

The bellows 57 is compressed by an actuator 67 which includes a slidable and rotatable stem 68 having a turning knob handle 69. The actuator stem 68 is guided by and is rotatable and slidable in the hollow boss end 71 of the casing 63. This boss 71 carries a pin 72 which is held in place by a ring of spring material 74. Diametrically opposed spiral slots 75 and 76 are cut in the stem 68 and the pin 72 extends through these slots. When the handle 69 is rotated, the pin 72 cooperating with the slots 75 and 76 will cause the stem to slide longitudinally. These slots are shown graphically in Fig. 6, this figure being a view of the stem slit on one side longitudinally and then flattened. A fragmentary view of the stem is also shown in Fig. 5 on a larger scale.

The stem 68 is pinned to the knob 69 by pin 78. The other end of the stem 68 extends into the cup 60 of the cell 55 and at its inner end carries a ring or washer 79 which is held in place by a spring type snap ring 81. A coil spring 82 surrounds the projecting end of the stem 68, one end of the spring abutting a shoulder 83 on the stem and the other end abutting the ring 79. The ring 79 is loosely mounted on the stem and is permitted to slide longitudinally of the stem but not to the right beyond the snap ring 81. A collar 84 is secured within the cup 60 which collar is arranged to be engaged by the ring 79. The slots 75 and 76 in the stem 68 are arranged so that when the handle 69 is turned clockwise, the stem and the parts carried thereby will be moved to the right as viewed in Fig. 2; the ring 79 will engage the collar 84 and impart a compressed movement to the bellows 57 with the consequent effect of forcing liquid out of the tube 53. The spring 82 and movable ring 79 are provided for the purpose of permitting quick turning of the knob 69, that is, the knob 69 can be turned clockwise quickly from one position to another. In this event, the stem 68 will move into the collar 84 until the inner end of the stem engages the inner end of the cup 60 at which time the cup will move with the stem and compress the bellows 57. Due to the fact that the distance from the end of stem 68 to ring 79 is less than the length of the collar 84, the ring 79 will engage the collar as the stem moves into the same and spring 82 will be compressed. After inward movement of the stem is discontinued, the spring 82 will continue to exert a yielding force on the collar 84 through the ring 79 to compress the bellows 57 until the ring 79 engages the retaining ring 81. Thus it will be seen that the operator may grasp and quickly turn the handle 69 through its complete travel and the energy will be stored in the spring 82 until it can be transmitted to the bellows 57. Preferably, the slots 75 and 76 are each provided at the left end thereof with notches 86 which receive the pin 72 and latch the stem 68 in the extreme right position. Other notches may be formed intermediate the ends of the slot for latching the stem in intermediate positions. A pair of said latter notches are shown at 87 which are formed by offsetting the spiral slots.

From the foregoing, it will be seen that when the knob 69 is in the position shown, valve 27 will rest upon the seat 24. When the handle 69 turns toward its other extreme position, liquid will be expelled from the cell 55. The amount expelled will be forced into the cell 39 to move the valve from the position shown in Fig. 3 to a position in which it seats upon seat 25. The stem 69 will be latched in position by reason of the interlatching of pin 72 in the notches 86 of slots 75 and 76. When the handle is turned counterclockwise from its extreme right position or when the handle is turned clockwise from its extreme left position, the slots 75 and 76 can be moved to a position in which the pin interlatches with notches 87 in which position the valve 27 will be moved to a position intermediate seats 24 and 25. It will be seen that the valve can be moved to various positions by a remotely disposed actuator.

The present invention is particularly useful in connection with airplanes wherein it is desirable to transfer fuel from one fuel tank to another. These tanks are usually located remotely from the pilot's cabin. The controller 50 will be placed on the dashboard or at a convenient place in the cabin and the operator may actuate a remotely disposed valve by merely turning the knob 69. As is well known, the parts of an airplane are subjected to great variations in temperature, since the plane may be started in a warm climate and then subjected to extreme cold temperatures in flight. Liquids employed in hydraulic systems contract and expand in response to decrease and increase in temperatures. Obviously, if the adjustment is such that the stem 68 is in its extreme left position and the valve 27 rests upon the seat 24 when the liquid is relatively warm, and the valve 27 rests upon seat 25 when the stem is moved to its extreme right position, the valve 27 will not be moved to rest upon seat 25 if the liquid is then subjected to a materially lower temperature; it will have contracted to such an extent that insufficient quantity thereof is present for expanding the bellows 42 to close the valve 27 on seat 25.

The present invention provides for compensating for the change in temperature. Although only three compensating devices have been shown, it is obvious that as many may be employed as are necessary. In the disclosure there is provided a compensator for the control 50, a compensator 52 intermediate the control 50 and the valve 20 and a compensator at the valve 20. Referring first to the compensator for the control 50 which is clearly shown in Fig. 2, this compensator includes a frame 89 in the form of a casing which houses a cell 90. The cell 90 includes a cup 91, an outer metallic bellows 92, an inner metallic bellows 93, an interconnecting sleeve 94 and a hollow stem 95. One end of the outer bellows 92 is hermetically joined with the right end of the cup 91 and the other end thereof is hermetically joined with the left end of sleeve 94. The right end of bellows 93 is hermetically joined with the right end of sleeve 94 and the opposite end of the bellows 93 is hermetically joined with an outward circular flare 97 of the sleeve 95. The extreme left ends of cup 91 and sleeve 95 are hermetically joined. This cell 90 is filled preferably with a liquid having the same expanding and contracting characteristics as the liquid employed in the main control. The sleeve 95 projects through the right end of casing 89 and is threaded at 98 for receiving lock nuts 99. These nuts 99 are used to shift the hollow stem 95 lengthwise in the frame 89 in the operation of initially adjusting the control.

A frame 101 in the form of a casing is disposed within the casing 89 and surrounds the cell 90. Frame 101 includes a cylindrical section 102 and an end 103. The end of the section 102 is turned inwardly as at 105 and is arranged to bear upon the outwardly extending flange portion 106 of the sleeve 94. The end 103 abuts the head 61 of bellows 58. A spring 108 is interposed between the right end of casing 89 and the inturned portion 105 of casing 101 and normally urges the end 103 of casing 101 against the head 61 of bellows 58 and also tends to urge the right end of cell 90 to the left. The left end of cell 90 is locked in position by adjustment of the sleeve 95 through the lock nuts 99. Thus by turning nuts 99, the stem 95 may be adjusted longitudinally to vary the initial tension on spring 108 and also the initial setting of the valve 27 since movement of the stem 95 is transmitted directly to the fluid in the system by the fluid in cell 90 and frame 101. The force of spring 108 is exerted on stem 95 through the fluid in cell 90; nuts 99 prevent stem 95 from moving into frame 89 in response to this force and also in response to force created by the expansion of the fluid in cell 90 as temperature rises.

A sleeve 110 is disposed within sleeve 95 and is hermetically joined with the hollow boss 111 on the head 61 of bellows 58. The conduit 53 extends through the sleeve 110 and is hermetically joined with said sleeve.

Changes in temperature of liquid in cell 90 with the consequent changes in pressure of the liquid affects the counteracting force of the cell on the spring 108. The pressure of the liquid in the cell 90 counteracts the tension of the spring 108 and if, for example, the temperature of the liquid in cell 90 is decreased, the pressure impressed by the end 103 of casing 101 upon the head 61 of the bellows 58 will be increased. Therefore, if the liquid in cell 55 is reduced in temperature, the liquid in cell 90 is also reduced in temperature with the consequent effect of causing the cell 55 to be decreased in size whereby the pressure within the cell remains unchanged. Conversely, if the temperature of the liquid in cell 55 is increased, the pressure of the liquid in cell 90 is also increased whereby great counteracting force is applied to spring 108 with the resultant effect of decreasing the tension upon the head of bellows 61 permitting the bellows 58 to expand. The size of cells 55 and 90 are so computed that when the cell 55 is subjected to varying temperatures, no liquid will be forced from or drawn into the same through the tube 53 and therefore the change in temperature at the control 55 will have no effect on the pressure in the main control system and the valve 27 will not be disturbed.

A similar compensating device is provided at the valve. The compensating device comprises a frame 112 in the form of a casing. This casing is attached to a plate 113 by screws 114 which plate in turn is attached to the right end of valve body 20 by screws 115. The compensator includes a cell 117 which is formed by a cup 118, an outer metallic bellows 119, a sleeve 120 having a flared end 121, and an inner metallic bellows 122. The left end of bellows 119 is hermetically joined with the flared end 123 of cup 118 and the opposite end of the bellows is hermetically joined with the flared end 121 of sleeve 120. The left end of bellows 122 is hermetically joined with the left end of cup 118 and the opposite end is hermetically joined with the circular shoulder 125 on the sleeves 120. This cell 117 is filled with the liquid having the same expansion and contraction characteristics as the main liquid in the control system. The bellows 119 is surrounded by a collar 126 having inwardly extending portion 127 which abuts the flared end 123 of cup 118. The right end of collar 126 is closed by a cap 128 which abuts the left side of the head 46 of bellows 45. A spring 129 is interposed between the left end of casing 112 and the portion 127 of collar 126. The pressure of the liquid in cell 117 counteracts the pressure of the spring 129 and the effective force thereof in its opposition to spring 129 varies with the change in temperature of the liquid whereby the pressure of the end 127 upon the head 46 of bellows 45 is varied so as to increase and decrease the capacity of the cell 39 in response to decrease and increase temperatures of the liquid in cell 39. The spring 129 normally urges the cell 117 including the sleeve 120 to the right and the sleeve is maintained in position by a snap spring 130 which lies within a groove in the sleeve 120 and abuts the left end of casing 112.

Since the valve is located remotely from the control 50, it is quite often subjected to material changes in temperature while the temperature of the control 50 may or may not change. Regardless of this the compensator at the valve is so computed as to maintain the pressure within the cell 39 constant by expanding and contracting the bellows 45 although temperature in cell 39 varies. The cells 117 and 39 are subjected to the same temperatures and the sizes thereof are computed so that the compensator prevents the flow of liquid into and out of the passage 48 upon changes in temperature.

The line connecting the controller 50 is also subjected to varying temperatures and it likewise is provided with a compensating device for preventing changes in pressure in the line. This compensator comprises a frame in the form of a casing 132 having an end 133, a bellows supporting plate 134 and an end plate 135. Plates 134 and 135 with the gasket 136 therebetween, are held in place by bolts 138 and nuts 139. The conduit 49 is hermetically joined at 140 with the end plate 135 and the conduit 53 is hermetically joined at 141 to a tube 142. Tube 142 extends longitudinally of casing 132 and is provided at the right end with a head 143 forming the end of a cell 144. In addition to the head 143, the cell 144 includes a metallic bellows 145 and the space 146 in the plate 134. One end of the metallic bellows is hermetically joined to the head 143 and the other end thereof is hermetically joined with the plate 134. Tube 49 connects with the interior of cell 144 through plate 135 and the tube 53 is connected with the interior of said cell through the hollow passage 148 of tube 142.

A cell 150 is enclosed in casing 132 and includes cup 151 having an outwardly flared end, and outer metallic bellows 153, a sleeve 154 having a flared end 155, and an inner metallic bellows 157. The left end of bellows 153 is hermetically joined with the flare 152 of cup 151 and the opposite end is hermetically joined with the head 156 of sleeve 154. The left end of bellows 157 is hermetically joined with the left end 158 of cup 151 and the opposite end thereof is hermetically joined to a shoulder 159 on the sleeve 154. This cell 150 is filled with the liquid having the same expansion and contraction characteristics as the main control liquid.

The bellows 153 is enclosed in a casing formed by a collar 161 having an inwardly extending left end 162 and a right end 163. The inwardly extending portion 162 abuts the flare 152 of cup 151 and the head 163 abuts the left face of the bellows head 143. A spring 164 is interposed between the left end of the casing 132 and the inwardly extending portion 162 of collar 161 and normally urges the cell 150 to the right. The inward movement of the sleeve 154 of the cell 150 is limited by a snap ring 165 which lies within a groove in the sleeve and abuts the left end 133 of casing 132. Like in the other compensator described, the spring 164 imparts a contracting movement to the bellows 145 while the pressure of the liquid in the cell 150 opposes the action of the spring.

The line from the controller to the valve motor cell 39 includes the conduit 53, a passage 148, cell 144, conduit 49, and passage 48 in the valve compensator. A variation in temperature of the liquid in this line will tend to vary the pressure of the cell 144. However, since the cell 150 is subjected to the same temperature as the liquid in the line, its pressure will also vary with the consequent effect of causing the bellows 145 to expand and contract by increasing and decreasing, respectively, the counteracting force of the liquid in cell 150 on the spring 164.

Preferably the liquid employed in the compensating cells is the same as the main or motive liquid in the closed system including cells 55, conduit 53, passage 148, cell 144, conduit 49, passage 48 and cell 39. Also the liquid employed should have a low congealing and freezing temperature.

Thus it will be seen from the present invention that the valve 27 will not be moved due to variation in temperature to which the entire control system is subjected or to variation in temperature of parts thereof only. Consequently, the valve 27 will be moved only when the valve actuator 69 of the controller 50 is actuated and the extent of movement of the valve will be constant regardless of temperature changes throughout the entire system or throughout parts only thereof.

Only one setting adjustment is necessary for the entire system and this is accomplished by adjusting the position of one of the free ends of any of the cells in the main or motive system. For example, the setting adjustment is shown in connection with the controller 50. In setting this adjustment, the knob 69 is moved to the position shown and then the position of the sleeve 95 is adjusted so that the valve 27 will rest upon its seat 24 with the proper tension. The sleeve is then locked in position by the lock nuts 99.

While the form of embodiment of the present invention as herein disclosed constitutes a preferred form, it is to be understood that other forms might be adopted, all coming within the scope of the claims which follow.

I claim:

1. A controller comprising in combination, an expansible and contractible cell adapted to contain fluid; means forming a fluid passage connected with the interior of the cell; a sleeve surrounding said means; a flexible wall connected with the sleeve; another wall connected with the sleeve and flexible wall to form an expansible and contractible fluid receiving cell, said second mentioned cell being operatively associated with the first mentioned cell to transmit movement thereto; and means for adjusting the position of said first mentioned cell.

2. A work transmitting device comprising in combination, an expansible, tubular cell for containing fluid, said cell being supported intermediate the ends thereof; means forming a fluid passage connected with the interior of said cell; means connected with one end of said cell for extending and compressing said cell in accordance with changes in temperature for maintaining pressure of fluid in said cell substantially constant during changes in temperature; and means connected to the end opposite said one end of said cell for extending and compressing said cell.

3. Control apparatus comprising in combination, a device to be controlled; a fluid motor for actuating said device; remotely disposed means for controlling the operation of said motor, said means having a fluid transmitter; a single fluid line connecting said transmitter and motor and cooperating therewith to form a closed fluid system, said transmitter and said motor being affectable by changes in temperature; and independent fluid containing temperature-responsive means connected with and located adjacent said motor and said transmitter, said temperature-responsive means compensating for volume changes in the fluid of said motor and transmitter caused by temperature variations.

4. Control apparatus comprising in combination, a device to be controlled; a fluid motor for actuating said device; remotely disposed means for controlling the operation of said motor, said means having a fluid transmitter; a single fluid line connecting said transmitter and motor and cooperating therewith to form a closed fluid system, the fluid in said transmitter, said motor and said line being affectable by changes in temperature; and an independent fluid containing temperature-responsive device disposed adjacent to and connected with each of said motor, said transmitter and said line to compensate for volume changes in the fluid therein due to local and general temperature variations.

5. Control apparatus comprising in combination, a device to be controlled; a fluid motor for actuating said device; remotely located means for controlling the operation of said motor, said means having a collapsible and expansible cell; a single conduit means extending between said cell and said motor and cooperating therewith to form a closed fluid system; means intermediate the ends of said cell for supporting the same; means for compressing and expanding one end of the cell for shifting fluid to and from said motor for normally adjusting the position of the device to be controlled; and temperature-responsive means for compressing and expanding the other end of said cell to vary the capacity thereof and compensate for volume changes in the fluid therein due to temperature variations.

6. Control apparatus comprising in combination, a device to be controlled; a fluid motor for actuating said device; a controller for said device including a fluid transmitter and means forming a conduit interconnecting said fluid motor and transmitter, said fluid motor transmitter, and means forming a closed system, said fluid transmitter including an expansible and contractible cell, means for supporting said cell intermediate the free ends thereof, manually actuated means for causing compression and expansion of one of the free ends of the cell for adjusting for normal position of said device, temperature responsive means for adjusting said end of said cell to change the capacity thereof, and means for causing compression and expansion of the other free end of the cell for varying fluid capacity of said cell for actuating the device through the first mentioned motor.

7. In a motion transmitting device, in combination, a support, an expansible and contractible cell for containing fluid, said cell being supported intermediate its ends on said support; means forming a fluid passage connected with the interior of said cell; resilient means on said support tending to impart a fluid moving force to one end of said cell, thermo-responsive means for controlling the application of force to said cell by said resilient means, said thermo-responsive means including an expansible and contractible cell adapted to contain fluid, and means independent of said thermo-responsive means for applying a fluid moving force to the opposite end of said first named cell.

8. Control apparatus comprising, in combination, a device to be controlled, a fluid motor for actuating said device; a controller for said device including a fluid transmitter, said motor and transmitter each having an expansible and contractible cell; said fluid motor and transmitter, said cells and said means forming a closed fluid system; an additional expansible and contractible temperature compensating cell located adjacent and mechanically connected to each of the other cells, said temperature compensating cells serving to change the volumetric capacity of the other cells in response to temperature changes.

9. A controller comprising in combination, an expansible and contractible cell adapted to contain fluid; means forming a fluid passage connected with the interior of said cell; means for selectively changing the volume of said cell to cause fluid to move in said passage; and combined means for initially adjusting said cell and compensating for variations resulting from temperature changes, said means including an adjustable support; resilient means tending to apply a fluid moving force to said cell; and a second expansible and contractible cell disposed between said adjustable support and said resilient means, said last mentioned cell serving to transmit movement from said support to said first cell and apply a fluid moving force to said first cell in response to temperature changes.

10. Control apparatus comprising in combination, a device to be controlled; a fluid motor for actuating said device; a controller for said fluid motor; said motor and said controller each having an expansible and contractible cell; means forming a conduit interconnecting said cells, said cells being affectable by variations in temperature; means in said controller and said motor for compensating for changes in said cells caused by changes in temperature, said means including a support adjacent each cell, one support being adjustable, resilient means tending to apply a fluid moving force to said cells; an expansible and contractible cell disposed between each of said supports and said resilient means, said last mentioned cells serving to apply a fluid moving force to the cells of said motor and transmitter in response to variations in temperature; and means for adjusting one of said supports to apply an initial fluid moving force to one of the first mentioned cells.

11. In a control device, the combination of a cylindrical casing; a fluid containing bellows supported in said casing; a fluid conductor communicating with the interior of said bellows and leading from said casing; a second fluid containing bellows disposed in said casing in axial alignment with and spaced relation from the first bellows; a mechanical connection between ends of said bellows to transmit movement therebetween so that expansion and contraction of the second will cause similar movements of the first; and resilient means in said casing tending to resist expansion of said bellows.

12. In a control device, the combination of a casing; a fluid containing bellows supported adjacent one end of said casing; a fluid conductor communicating with the interior of said bellows and leading from said casing; a member projecting from the opposite end of said casing toward said bellows; a second fluid containing bellows supported and guided by said member for expansion and contraction; means forming a mechanical connection between corresponding ends of said bellows to transmit movement therebetween so that movement of the second will impart similar movement to the first; and means in said casing tending to yieldingly resist movement of said bellows in one direction.

13. In a control device, the combination of a cylindrical casing; a fluid containing bellows supported in said casing; a fluid conductor communicating with the interior of said bellows and leading from said casing; a second fluid containing bellows disposed in said casing in axial alignment with and spaced relation from the first bellows; a mechanical connection between corresponding ends of said bellows to transmit movement therebetween so that expansion and contraction of the second will cause similar movement of the first; resilient means in said casing tending to yieldingly resist movement of said bellows in one direction; and means for manually imparting movement to one of said bellows.

14. In a control device, the combination of a cylindrical casing; a fluid containing bellows supported in said casing; a fluid conductor communicating with the interior of said bellows and leading from said casing; a second fluid containing bellows disposed in said casing in axial alignment with and spaced relation from the first bellows; a mechanical connection between corresponding ends of said bellows to transmit movement therebetween so that expansion and contraction of the second will cause similar movement of the first; resilient means in said casing tending to yieldingly resist movement of said bellows in one direction; means for manually imparting movement to one of said bellows; and means for retaining said manual means in different positions of adjustment.

WILLIAM C. DENISON, Jr.

REFERENCES CITED

The following references are of record in the file of this patent:

UNITED STATES PATENTS

| Number | Name | Date |
|---|---|---|
| 1,840,953 | Hoffman | Jan. 12, 1932 |
| 1,881,266 | De Giers | Oct. 4, 1932 |
| 2,072,693 | Volkert | Mar. 2, 1937 |
| 1,815,157 | Loughead | July 21, 1931 |
| 2,168,215 | Keitel | Aug. 1, 1939 |
| 1,841,696 | Andres | Jan. 19, 1932 |
| 1,934,548 | Kellogg | Nov. 7, 1933 |
| 2,059,042 | Schweller | Oct. 27, 1936 |
| 2,361,885 | Tate | Oct. 31, 1944 |
| 2,286,661 | Warner | June 16, 1942 |
| 2,300,675 | Jones | Nov. 3, 1942 |
| 2,308,048 | Brown | Jan. 12, 1943 |

FOREIGN PATENTS

| Number | Country | Date |
|---|---|---|
| 349,914 | Great Britain | May 27, 1931 |
| 419,309 | Great Britain | Nov. 11, 1934 |
| 771,565 | France | July 20, 1934 |
| 604,798 | Germany | Oct. 30, 1934 |
| 522,119 | Great Britain | June 10, 1940 |